C. H. CARLSON.
BUTTER AND LARD CUTTER.
APPLICATION FILED JAN. 16, 1909.
933,621.
Patented Sept. 7, 1909.
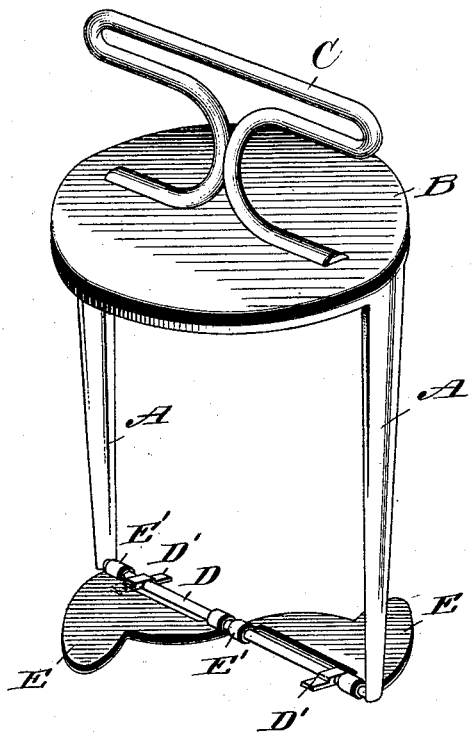
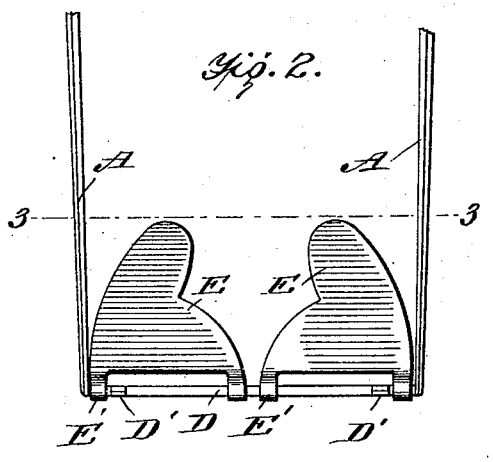
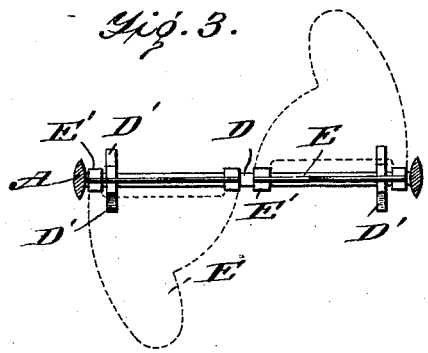
WITNESSES
INVENTOR
CARL H. CARLSON,
BY
ATTORNEYS

UNITED STATES PATENT OFFICE.

CARL H. CARLSON, OF IRON MOUNTAIN, MICHIGAN.

BUTTER AND LARD CUTTER.

933,621.  Specification of Letters Patent.  Patented Sept. 7, 1909.

Application filed January 16, 1909. Serial No. 472,629.

*To all whom it may concern:*

Be it known that I, CARL H. CARLSON, a citizen of the United States, and a resident of Iron Mountain, in the county of Dickinson and State of Michigan, have made certain new and useful Improvements in Butter and Lard Cutters, of which the following is a specification.

This invention is an improvement in self measuring lard and butter scoops for use in taking lard or butter out of barrels, tubs or other receptacle; and the invention consists in certain novel constructions and combinations of parts as will be hereinafter described and claimed.

In the drawings, Figure 1 is a perspective view of the invention with the blades spread horizontally or opened, as in lifting the lard or butter. Fig. 2 is a side view of the lower portion of the device with the blades adjusted to position as in entering the mass of lard or butter, and Fig. 3 is a detail cross section on about line 3—3 of Fig. 2, the blades being opened in dotted lines.

In carrying out my invention I provide uprights A, supported from the top B, having a handle C, whereby the device may be lifted or may be turned and the uprights A are brought to an edge at both sides as shown in Figs. 1 and 3, so the device may be turned in a keg of lard or butter or similar material, and the cross bar D connects the lower ends of the uprights A and forms a support for the blades E, which are pivoted at one edge at E' on the rod D, and the latter is provided with lateral projections or shoulders D', preferably extending to both sides of the rod as shown, so they may support the blades at either side of the cross rod. These blades may be of any suitable size and shape, and may be regulated as to size according to the amount of material it is desired to measure at each operation of the device.

In operation the device may be pressed down into a mass of butter, lard or the like, in which operation the blades will assume an upright position, as shown in Fig. 2, and when the device has been pushed down to the desired point, it may be given a half turn either to the right or left, which will cause the two swinging blades to be lowered to the horizontal position shown in Fig. 1, and serve as platforms upon which to take out the cores of lard or butter, or other material, and when removed from the keg or other receptacle the measuring device may be turned to one side and the material will drop easily off the blades.

Manifestly, the blades may be made of different sizes to measure different quantities of the material, and the blades or other portions of the device may be of any suitable metal or material adapted for the purpose.

I claim—

1. A device substantially as described comprising a top plate, a handle thereon, uprights connected with the body and having the cutting edges at their opposite sides, a rod connecting the lower ends of the uprights, and having lateral projections, and blades pivoted on the rod, on opposite sides of the center thereof, and arranged to be adjusted to an upright position and to a horizontal position in the use of the invention, and to rest when in horizontal position upon the lateral projections of the rod, substantially as set forth.

2. A device substantially as described comprising a pair of blades arranged side by side, and a carrier to which the blades are pivoted whereby they may be opened or closed in the operation of the invention, substantially as described.

3. A device substantially as described comprising a pair of uprights, a rod connecting the same, and blades pivoted on said rods on opposite sides of the center and adapted to adjust between an upright and a horizontal position, and means for stopping the blades in horizontal position, substantially as set forth.

4. A device substantially as described comprising a pair of uprights, and means carried thereby for lifting the material from a mass thereof, substantially as set forth.

5. A device substantially as described comprising a pair of uprights, a rod connecting the same, and having lateral projections extending on opposite sides of the rod, and blades pivoted to the rod on opposite sides of the center thereof, and adapted to rest upon the lateral projections when in horizontal position, substantially as set forth.

CARL H. CARLSON.

Witnesses:
R. T. MILLER,
R. L. OLIVER.